(12) United States Patent
Reddy et al.

(10) Patent No.: US 12,463,428 B2
(45) Date of Patent: Nov. 4, 2025

(54) SYSTEMS AND METHODS FOR MULTIPLE ENERGY STORAGE SYSTEM DISPATCH

(71) Applicant: Caterpillar Inc., Peoria, IL (US)

(72) Inventors: Suresh B. Reddy, Peoria, IL (US); Kevin J. Sergott, Dunlap, IL (US); Ronald C. Gayles, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 85 days.

(21) Appl. No.: 18/480,875

(22) Filed: Oct. 4, 2023

(65) Prior Publication Data

US 2025/0118965 A1 Apr. 10, 2025

(51) Int. Cl.
| | |
|---|---|
| *H02J 3/32* | (2006.01) |
| *H02J 3/38* | (2006.01) |
| *H02J 3/46* | (2006.01) |
| *H02J 7/00* | (2006.01) |

(52) U.S. Cl.
CPC ........... *H02J 3/32* (2013.01); *H02J 3/381* (2013.01); *H02J 3/46* (2013.01); *H02J 7/0048* (2020.01); *H02J 7/00712* (2020.01); *H02J 2203/10* (2020.01); *H02J 2300/30* (2020.01)

(58) Field of Classification Search
CPC .................................................. H02J 3/32
See application file for complete search history.

(56) References Cited

U.S. PATENT DOCUMENTS

| | | | |
|---|---|---|---|
| 9,367,108 B2 | 6/2016 | Asghari et al. | |
| 10,998,732 B2 | 5/2021 | Reddy et al. | |
| 11,188,045 B2 | 11/2021 | Reddy | |
| 2014/0336840 A1* | 11/2014 | Geinzer | H02J 3/381 |
| | | | 700/297 |
| 2015/0039145 A1* | 2/2015 | Yang | G05B 13/02 |
| | | | 700/291 |
| 2015/0051747 A1 | 2/2015 | Asghari et al. | |

(Continued)

FOREIGN PATENT DOCUMENTS

| | | | | |
|---|---|---|---|---|
| CN | 108631348 A | | 10/2018 | |
| CN | 108631348 | * | 6/2020 | ............. G06Q 10/06 |
| JP | 7221131 B2 | | 2/2023 | |

OTHER PUBLICATIONS

Written Opinion and International Search Report for Int'l. Patent Appln. No. PCT/US2024/046101, mailed Jan. 2, 2025 (15 pgs).

*Primary Examiner* — Adi Amrany
(74) *Attorney, Agent, or Firm* — Bookoff McAndrews PLLC

(57) ABSTRACT

A microgrid system includes an electrical bus including at least one electrical load; at least one non-energy storage system asset configured to supply electrical power to the electrical bus; an energy storage system group including: two or more energy storage system assets configured to supply electrical power to the electrical bus, and a system controller operatively coupled to each of the assets on the electrical bus. The system controller is configured to: determine characteristic energy set points and power limits for each of the assets; determine that at least two or more assets have a same priority for power distribution; determine the characteristic power set points for the non-energy storage assets, dispatch the energy storage system assets having the same priority by treating a dispatch for the energy storage system assets as a combined asset.

18 Claims, 7 Drawing Sheets

(56) References Cited

U.S. PATENT DOCUMENTS

| | | |
|---|---|---|
| 2019/0020196 A1 | 1/2019 | Poon |
| 2020/0301383 A1 | 9/2020 | Reddy |
| 2021/0281079 A1* | 9/2021 | Valcan .................... H02J 3/32 |
| 2022/0131388 A1 | 4/2022 | Sergott et al. |
| 2022/0416545 A1 | 12/2022 | Diamond et al. |

* cited by examiner

SYSTEMS AND METHODS FOR MULTIPLE ENERGY STORAGE SYSTEM DISPATCH

TECHNICAL FIELD

The present disclosure relates generally to systems and methods for dispatching electrical assets, and more particularly, to systems and methods for prioritizing and dispatching energy on electrical grids having multiple energy storage systems.

BACKGROUND

Energy storage (ES) assets serve a vital function on an electrical grid. The ESS assets can help defer and thus minimize costs by acting as an energy sink during periods of low relative electricity cost while serving as a source during periods of relatively high electricity costs. Additionally, ESS assets make a grid more robust, providing a level of energy reserve in the case of prolonged or unexpected unavailability of other assets such as a utility grid or electrical generators. They can also fill gaps between periods of inoperability of renewable assets, such as photovoltaic assets during periods of inoperability (e.g., night for photovoltaic assets or during prolonged periods without wind for wind turbines, etc.)

Electrical grids can have multiple ESS assets on a single grid. These multiple ESS assets can each have specific characteristics or attributes which may require prioritization for when the ESS asset can be placed on a given grid. The prioritization can be based on multiple factors such as, for example, the size of the ESS asset, the type of ESS asset, the internal characteristics of batteries (chemical, electrical, etc.) of the ESS asset, characteristics of the microgrid onto which the ESS asset will be placed (number of assets running, number and size of loads to be powered, etc.), life expectancy of the grid and its intended purpose, cost optimization of the assets on the grid, as well as other factors.

For instance, different battery sizes and chemistries possess varying lifespans and sensitivities to cycling, necessitating distinct operating sweet spots and desired state of energy (SOE) ranges. Moreover, factors such as charge/discharge rates are determined not only by operational needs but also by energy storage system (ESS) efficiency and degradation considerations. A comprehensive approach to prioritization can ensure that ESSs are operated optimally based on their unique characteristics.

In some embodiments, it may be required to accommodate a diversity of ESS assets with a same or similar priority for operation on the grid, while still recognizing that ESS assets can have different attributes (e.g., electrolyser hydrogen storage systems may have different efficient operating regions compared to battery/inverter systems).

U.S. Pat. No. 11,188,045, ("the '045 patent"), describes methods and systems for optimizing energy management of an energy resource site using a hierarchical energy management system that effectively controls energy resources by allocating functionality using different tiers. The '045 patent describes a micro-grid system having a plurality of power sources, including at least at least one energy storage unit (ESU), at least one genset, and an asset management controller (AMC) configured to service a load on a common bus. The AMC is configured to prioritize the various power sources according to a cost function that accounts for various operational factors associated with each power source. The operational factors for the ESU may include at least power losses during discharge, power losses during charging, type of storage (e.g., battery, ultracapacitor, etc.), battery chemistry, state of charge (SOC), state of health (SOH), number of discharge cycles, depth of discharge, and an optimal SOC range.

However, the '045 patent does not disclose or suggest systems and methods for prioritizing and dispatching ESSs in the same microgrid system. The systems and methods for multiple ESS dispatch of the present disclosure address this and other deficiencies of the prior art. The scope of the current disclosure, however, is defined by the attached claims, and not by the ability to solve any specific problem.

SUMMARY

In one aspect, a microgrid system includes an electrical bus including at least one electrical load; at least one non-energy storage system asset configured to supply electrical power to the electrical bus; an energy storage system group including: two or more energy storage system assets configured to supply electrical power to the electrical bus, and a system controller operatively coupled to each of the assets on the electrical bus, wherein the system controller is configured to: determine characteristic energy set points and power limits for each of the energy storage system asset; determine that at least two or more energy storage system assets have a same priority for power distribution; determine the characteristic power set points for the non-energy storage system assets, generate a dispatch signal for the energy storage system assets having the same priority by treating a dispatch for the energy storage system assets as a combined asset, using weighted set points while modifying a charge/discharge limit based on individual energy storage asset state of charge and state of energy conditions, load and non-energy storage asset power characteristics, and dispatch individual ones of the energy storage system assets having the same priority by weighting of modified charge and discharge limits.

In another aspect, a method of operating a microgrid system includes determining that multiple energy storage systems have an equivalent priority; generating a composite energy storage system for the multiple energy storage systems with an equivalent priority; revising individual charge and discharge limits of individual ones of the multiple energy storage systems that have an equivalent priority based on individual characteristic power set points of the individual ones of the multiple energy storage systems; dispatching a combined energy storage system asset based on characteristic power set points of the composite energy storage system; and dispatching individual energy storage system assets of an equivalent priority by weighting of modified charge and discharge limits.

In yet another aspect, a microgrid system controller operatively coupled to an electric bus includes a processor, and a memory, storing one or more instructions. When executed by the processor, the instructions cause the system controller to: determine characteristic energy set points and power limits for each energy storage system asset; determine that at least two or more energy storage system assets have a same priority for power distribution; determine the characteristic power set points for non-energy storage system assets, generate a dispatch signal for energy storage system assets displaying the same priority by developing a dispatch for the energy storage system assets as a combined asset, using weighted set points for energy while modifying a charge/discharge limit based on individual energy storage asset state of charge and state of energy conditions, load and non-energy storage asset power characteristics, and dispatch individual energy storage system assets of an equivalent priority by weighting of modified charge and discharge limits.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
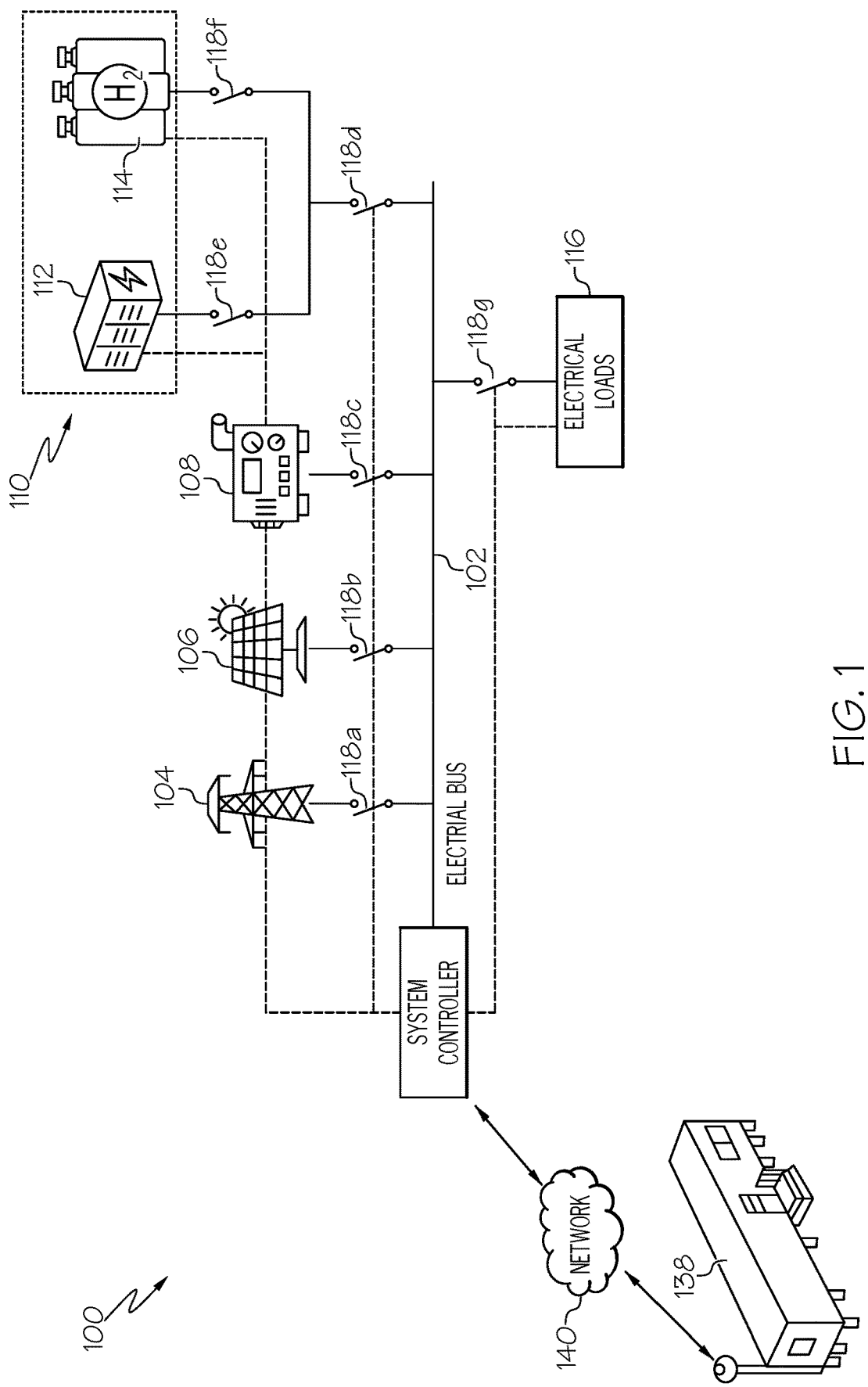
FIG. 1 is a schematic system diagram showing a microgrid system, according to aspects of the disclosure.

FIG. 1 shows an exemplary microgrid 100. The microgrid 100 includes an electrical bus 102 with multiple assets (which can be arranged into asset groups in any arrangement) and loads attached to the electrical bus 102. The microgrid 100 generally includes non-energy storage system (non-ESS) electrical assets and ESS electrical assets. Non-limiting examples of non-ESS electrical assets that can be attached to the electrical bus 102 include a utility grid 104, one or more renewable assets including, for example, a photovoltaic asset 106, one or more gensets 108. The ESS electrical assets that can be coupled to the microgrid 100 may be in an ESS group 110. While FIG. 1 shows only one photovoltaic asset, it is understood that the photovoltaic asset 106 can be replaced by any set of diverse renewable assets in any combination. For example, the photovoltaic asset 106 can be replaced by any combination of assets that rely on photovoltaics, wind turbines, geothermal, hydroelectric, biomass, tidal, biofuel, and the like. Similarly, the gensets 108 can embody any combination of rotor-stator combinations driven by a prime mover such as gas, diesel, dynamic gas blending (DGB) combustion engine that can operate at a constant speed or variable speeds and can include any type of electrical generator, for example, without limitation, a diesel generator, a gas reciprocating generator, a gas turbine generator, a hydrogen reciprocating generator, generators with any blends of fuels, etc. ESS assets can include, without limitation, a battery type ESS 112 (lead-acid, Li-ion, etc.), a hydrogen storage ESS 114, and other types of ESS. For example, ESS assets on the microgrid 100 can include electrochemical units with various rechargeable battery chemistries, lithium-ion, high-power lead acid, fuel cells, ultra-capacitors, flow batteries, etc. or mechanical storage including flywheels, pumped hydro, compressed air storage, gravitational potential energy, etc. or thermal storage, and the like. The microgrid 100 can further include various loads 116—these loads may be set (not capable of control), but some of them may be smart loads that can be commanded by the microgrid system controller 130. Each of the various assets and loads can be separable from the electrical bus 102 by a breaker 118a-118g for isolating the various assets and loads from the electrical bus 102.

The assets and/or asset groups, loads, and breakers can be controllable, at least in part, by one or more controllers. For example, the microgrid 100 may have a microgrid system controller 130 that may be capable of controlling one or more of the asset groups, loads, or other components of the microgrid 100. For example, in some embodiments, the microgrid system controller 130 may control the breakers 118 to open or close the breakers, placing energy resource groups and/or loads on the microgrid 100. Additionally, the microgrid system controller 130 may control the opening or the closing of one or more tie breakers (not shown) between different electrical buses to open or close tie breakers between the individual buses to electrically connect different buses (in embodiments of the microgrid having multiple buses). In embodiments having multiple buses, each of the buses may form its own electrical grid when isolated from the others. Further, two of the buses may form an electrical grid separate from the other bus. The microgrid system controller 130 may be connected to a back office 138 via a network 140 (e.g., a cloud network). The microgrid system controller 130 may be configured to compare an actual output of the plurality of power sources on the microgrid 100 to a desired output and selectively control and adjust the power output of each power source to meet the power demand of the loads 116.

The multiple breakers 118 selectively connect buses, electrical assets, and electrical loads. The breakers may be circuit breakers that connect two buses or sections of an electrical bus serving different power sources or different electrical buses. When closed, current can pass in either direction between them, flowing from source(s) to sink(s). Each breaker is associated with the two electrical buses or portions of a bus it connects. Different portions of a bus or different buses could also be controlled by other controllers connected to the bus, for example, other controllers similar to the microgrid system controller 130.

The microgrid system controller 130 may communicate at the energy resource group controller level or may communicate with individual asset controllers. The microgrid system controller 130 can be located anywhere. For example, the microgrid system controller 130 can be located on site (e.g., in the back office 138) or remotely. The back office 138 can include one or more interfaces for an operator to input configuration inputs to configure the microgrid. In some embodiments, the back office 138 may also receive operational inputs and provide interfaces to view one or more configuration or operational outputs (e.g., on a display configured to display monitor microgrid operation).

The microgrid system controller 130 may manage the electrical grid using one or more commands. For example, the microgrid system controller 130 may generate one or more individual asset on/off commands for placing gensets, fuel cells, and other controllable assets on the grid. Renewable assets, such as photovoltaic assets can be placed on the grid, but in some instances, due to their nature, these assets may be taken off of the grid due to reduced capacity (e.g., failures, environmental conditions (e.g., lack of sunlight, lack of wind, etc.), etc.)

The microgrid system controller 130 can monitor the maximum available power supplied by the non-ESS assets available to the microgrid 100 (e.g., the utility grid 104, the photovoltaic assets 106, and the gensets 108). If the non-ESS assets alone cannot manage the loads 116, the microgrid system controller 130 can enable the ESS group 110 to supplement load sharing. If the load is less than what the non-ESS assets need to supply, at a minimum, the microgrid system controller 130 can redirect excess power from the electrical bus 102 to the ESS group 110 to store the excess power as reserve power in one or more assets of the ESS group 110. Additionally, the ESS assets may be used as a buffer for economic operation of non-ESS assets, i.e. charging/discharging to bring the non-ESS assets operation to a range that is economical. Charging/discharging may be enabled to keep total levels of energy storage within limits of state of charge (SOC) or state of energy (SOE), i.e. enable charging when SOC/SOE is below a minimum, or enable discharging when SOC/SOE is above a maximum. In some embodiments, the microgrid system controller 130 may not send excess electrical capacity to the ESS group 110 if, for example, energy costs are currently high (e.g., from the utility grid) or there is insufficient power from one or more renewable sources of energy. In embodiments, the microgrid system controller 130 can evaluate one or more of a volatility factor for intermittent sources, a kW/kVA threshold, an available power source(s), and one or more other factors to determine a cost function associated with using electrical energy from each asset and/or the microgrid as a whole.

The network 140 can be, for example, a wired or wireless network, Wi-Fi, or a cellular network that includes a plurality intercommunication devices (e.g., modems, Wi-Fi, cellular devices, etc.) The network 140 can include one or more satellites and one or more ground stations (e.g., the back office 138), wherein the ground stations may be configured to wirelessly communicate to transmit and receive data from the satellites.

The ESS group 110 can include any number of ESS of varying type and with varying characteristics. The ESS systems deployable on the microgrid 100 can include batteries of different capacities, chemistries, and with other different characteristics. The ESS group 110 can also include hydrogen storage systems with one or more electrolysers and/or one or more pumped hydro systems.

Figure 2:
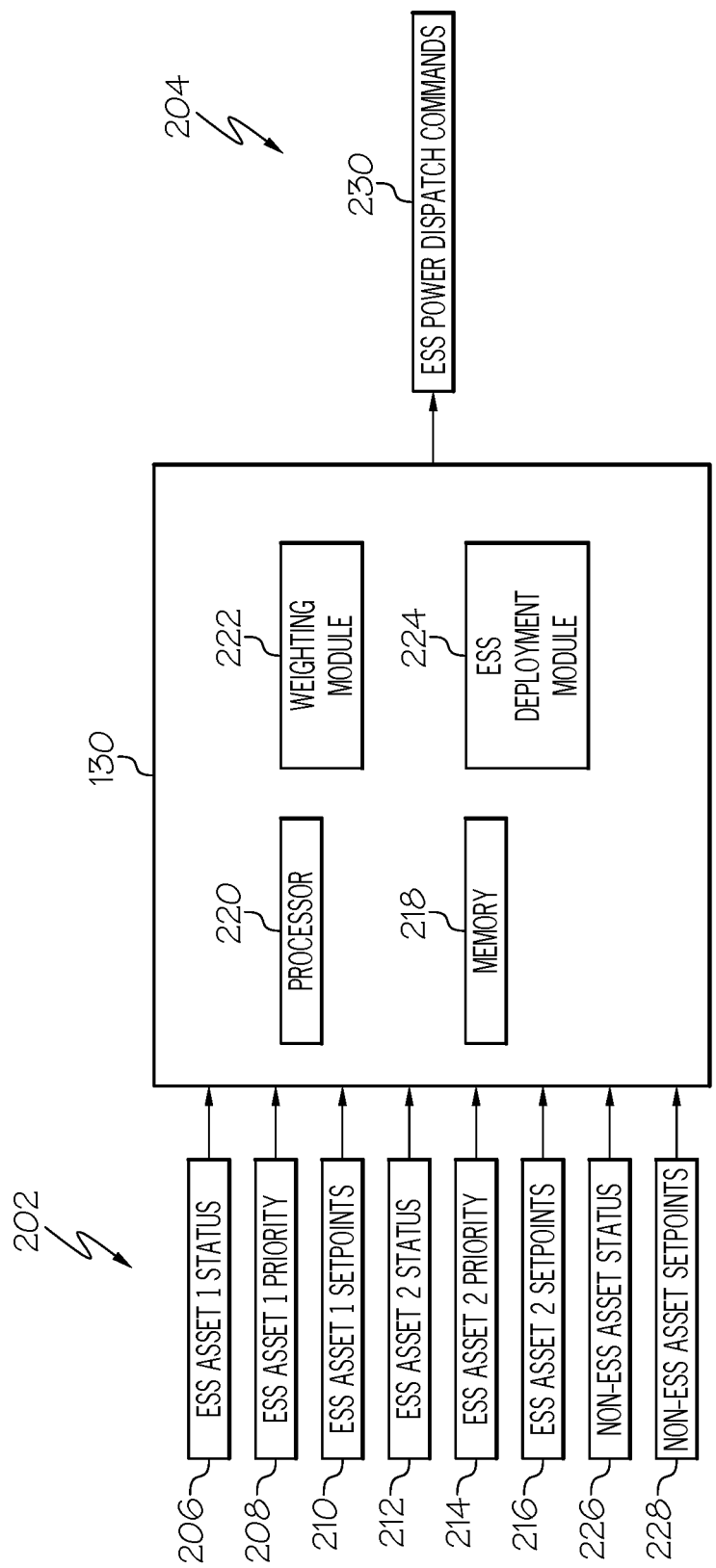
FIG. 2 is an exemplary system controller for controlling the microgrid system of FIG. 1.

FIG. 2 shows the microgrid system controller 130 in greater detail. The microgrid system controller 130 can receive inputs 202 and generate outputs 204 to various modules including a weighting module 222 and an ESS deployment module 224. The inputs 202 may include an ESS asset 1 status input 206, an ESS asset 1 priority input 208, an ESS asset 1 setpoints input 210, an ESS asset 2 status input 212, an ESS asset 2 priority input 214, an ESS asset 2 setpoints input 216, a non-ESS asset status input 226, and a non-ESS asset setpoints input 228. In general, the inputs 202 may be generated by a system operator (human) for example, at the back office 138, or remotely, or some inputs may be generated and/or determined by the microgrid system controller 130 itself. While FIG. 2 shows the case for two ESS units, it can be many ESS units. In some embodiments, the system controller, group asset controllers, or individual asset controllers can be on site outdoors or indoors (office) or connected via network remotely. The outputs 204 can include, for example, an ESS power dispatch commands 230 (which may be one or more ESS power dispatch command signals). The inputs 202 can be input using, for example, a human machine interface (HMI), and can be input in response to question prompts from microgrid system controller 130. The outputs 204 can be output causing one or more actions to be taken based on the output, such as, for example, placing an ESS on the microgrid 100, causing data to be displayed, or one or more other outputs. Additionally, it is to be noted that, while FIG. 2 depicts a single controller, the functions described with respect to the microgrid system controller 130 could be distributed amongst a plurality of controllers.

The ESS asset 1 priority input 208 and the ESS asset 2 priority input 214 can be based on a priority of the two assets. The priority may be based on, among other things, a cost function of the ESS asset. The cost function may account for various operational factors associated with each power source and a comparison to a cost associated with providing electrical energy from another source (e.g., a tie-in to the utility grid 104, etc.) The cost function can represent, for example, an aggregate cost of operating the corresponding power source based on one or more operational factors. In some embodiments, the microgrid system controller 130 can selectively distribute load to each power source based on priority or other factors. In some embodiments, various assets may have an equivalent priority (e.g., an equivalent cost function). Priority is not only determined based on cost function, however. For example, in some embodiments, priority can be based on one or more asset characteristics or attributes, for example, a fuel type for a given asset (e.g., diesel, gasoline, natural gas, etc.), a classification of the asset as renewable, genset, ESS, etc., a use schedule, a magnitude of loading, redundancy and robustness requirements, and other factors.

The microgrid system controller 130 can include a memory 218, which can include, for example, a secondary storage device, and processor(s) 220, such as central processing unit(s), networking interfaces, or any other means for accomplishing tasks consistent with the present disclosure. The memory 218 or secondary storage device associated with the microgrid system controller 130 may store data and software to allow the microgrid system controller 130 to perform its functions, including the functions described below with respect to methods 600 and 700, discussed in greater detail herein, and the functions of the microgrid configuration and control system described herein. The memory 218 can store, for example, one or more instructions that, when executed by the processor, cause the microgrid system controller 130 to perform one or more of the actions described herein. For example, the memory 218 can store one or more instructions that cause the microgrid system controller 130 operate based on one or more of the limits or thresholds described herein with respect to the various power sources and loads. Unless otherwise specifically stated, this data can be stored as one or more user selectable settings such that a user can adjust the setting via an external computing device (e.g. in the back office 138) that may be communicatively coupled with the microgrid system controller 130. The thresholds can be stored as a look-up table that stores the relevant settings for each particular type of power source and/or load. One or more of the devices or systems communicatively coupled to the microgrid system controller 130 may be communicatively coupled over a wired or wireless network, such as the Internet, a Local Area Network, WiFi, Bluetooth, or any combination of suitable networking arrangements and protocols.

Figure 3:
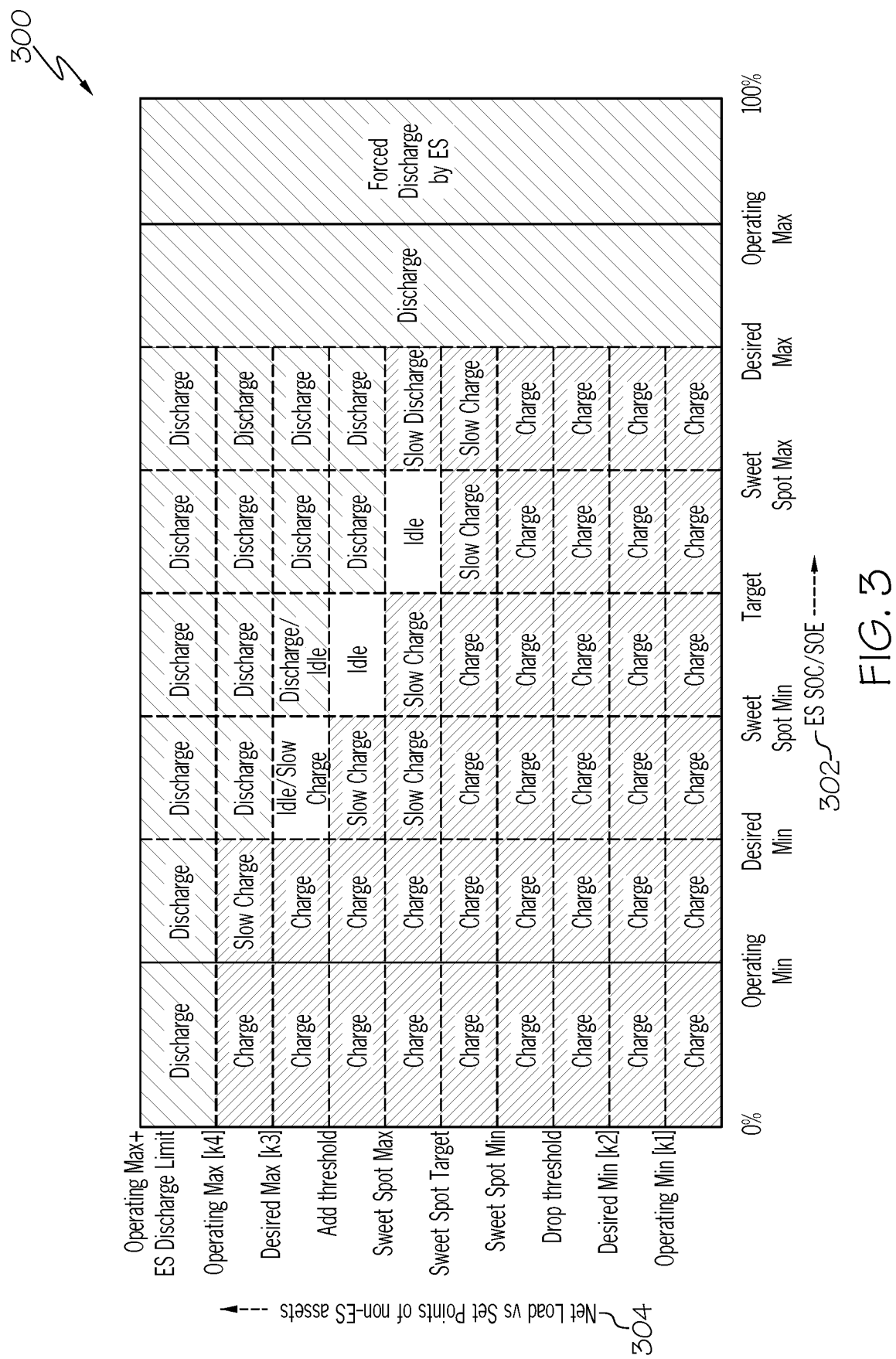
FIG. 3 is an operational chart for a microgrid having the assets of the microgrid system of FIG. 1 and for optionally operating the assets with a composite energy storage system.

FIG. 3 shows a chart 300 that describes some aspects of operation of some exemplary microgrids having a single ESS asset on the microgrid. The x-axis shows an exemplary ESS SOC/SOE 302 and the y-axis shows a net load as compared with the setpoints of the cumulative non-ESS assets 304. In general, each ESS asset has a number of operational thresholds akin to rules that ensure a long useable lifetime and optimizing existing reserve power for the micro-grid system 10. Each ESS asset has characteristics related to power as well as energy: the power characteristics include charge and discharge limits, which are determined for example, by a battery management system, in a battery-based ESS asset. The characteristic energy setpoints may be the SOC or the SOE or specific limits with respect to operation of the ESS and the SOC/SOE, such as, for example, operating minimum and maximum (beyond which an ESS asset cannot be safely operated on a microgrid bus (e.g., the electrical bus 102)), desired minimum and maximum (beyond which operation is possible, but not desirable-generally based on life considerations), sweet spot minimum and maximum (beyond which operation is permissible, but not optimal-(these limits may be generally based on combination of life and efficiency considerations, for example)).

Similarly, the non-ESS assets on the microgrid 100 (e.g., the utility grid 104, the photovoltaic asset 106, and the gensets 108) can exhibit a plurality of operational thresholds, which operational thresholds can ensure operational longevity and efficiency as well as other aspects of operation (e.g., minimum fuel consumption, optimal spinning reserve, lowest emissions production while reducing the number of power cycles (i.e. start/stop cycles) and avoiding minimum loading conditions, etc.) The thresholds are generally set in relation to the power rating(s) of the asset—for an asset that is only uni-directional for active power (e.g. genset, meant to only produce active power, or a smart load meant to only absorb active power), there are thresholds set based on active power (kW) rating, while for an asset that is bi-directional (can produce as well as absorb power, e.g., utility grid), the thresholds are set separately for positive power based on positive rating and negative power based on negative rating. The thresholds can be, for example: operating min/max (beyond which operation is not permitted—for safe and stable operation without damage to components, which can cover the full 0% to 100% rating for an asset that is only one sided, but can be less than that full range—for example, fuel cell assets generally require a non-zero minimum % loading for stable operation; the operating max for photovoltaics is within the 100% rating, but varies from 0% to 100% based on irradiance); desired min/max (beyond which operation is possible but not desirable-based on component damage/life considerations, such as wet stacking in gensets); sweet spot min/max (beyond which operation is permissible but not optimal for economic and/or emissions or other customer driven considerations-driven by pricing, efficiency and/or emissions—for gensets, this is the most fuel efficient range; for utility grid, this is the lowest unit cost range). A sweet spot target between sweet spot minimum and maximum may also be specified. Additionally, there may be add and drop thresholds for assets beyond which a next priority non-ESS asset can be added (e.g., an additional genset) when, for example, a total loading exceeds an add threshold, or a lowest priority running non-ESS asset is dropped when loading drops below a drop threshold.

In the chart 300, net load can correspond to the active (real, kW) load on the system. The net load may be that load that needs to be balanced by the microgrid dispatch of active or real power (KW). The chart 300 can be used for, for example, a case of dispatch involving a single ESS asset and/or used in a case of dispatching multiple ESS assets. While the distribution of power among non-ESS assets is not the primary concern of this invention, it is described here to provide context to the invention, and is based on U.S. Pat. Nos. 10,998,732, 11,188,045. The decision on running assets is based on load and reserve needs, including considerations of capabilities of ESS assets, as well as priority of assets.

Reserve needs can be determined based on possible transient loads to be accounted, per customer input, as well as volatile power (which can be expressed as the product of volatility factor and the intermittent renewable power) from intermittent renewables. In microgrid systems such as the microgrid 100 described herein, at least one of the running assets needs to be grid forming capable, and if ESS assets online are not grid forming capable, the highest priority grid forming capable asset can be placed in operation in order that. Beyond that, running assets can be decided based on load and reserve needs (i.e., whether reserve needs are met). If running assets cannot support load and reserve combined, next priority assets are brought in line. Similarly, if running assets can be reduced and still support load and reserve combined, lowest priority running assets are dropped. Sometimes, an alternative or additional approach is used for adding or dropping assets to/from the collection of running assets, via the use of add and drop thresholds (shown in chart 300 Y axis). If the load exceeds add threshold, next priority asset (highest priority among non-running assets) is brought in line, and if the load drops below drop threshold, lowest priority running asset is disengaged. If add/drop thresholds are not specified, only load and reserve (e.g., a desired reserve electrical power) considerations are used for adding and dropping assets.

The load distribution among running non-ESS assets themselves is decided based on set priorities or cost functions, while staying within various bounds (denoted as k1-k4 in the chart) in the following order—it is ensured that (i) the running assets are at least at or above operational minimum if possible (k1), (ii) then, at least at or above desired minimum (k2) if possible, (iii) then, at most at or below desired max (k3) if possible, and (iv) finally, at most at or below operating max (k4) if possible. In each of these scenarios, loading is prioritized based on priority set for the non-ESS assets. Priority can be set a priori by a user (e.g., a customer), based on asset type (e.g., renewables preferred over gensets for loading), and set among the same asset types based on life/running hours (e.g., gensets with lower running hours are prioritized above gensets above higher running hours). For example, if photovoltaics and gensets are operational on the microgrids, and photovoltaics have a higher priority compared to gensets implying photovoltaics are loaded first within its capability limits, while meeting minimum loading requirements of gensets.

The ESS SOC/SOE 302 is broken down into units based on a SOC/SOE of the single asset on the exemplary microgrid. The ESS SOC/SOE 302 (i.e., the position on the X-axis) could be determined based on, for example, the ESS 1 status input 206 and/or the ESS 1 setpoints input 210. The X-axis is demarcated based on power set point characteristics of the ESS, which can include set points at the following points: an operating minimum, a desired minimum, a sweet spot minimum, a target charge/energy, a sweet spot maximum, a desired maximum, an operating maximum, and one hundred percent. The Y-axis is demarcated based on the status of the non-ESS assets' active power set points (KW): an operating minimum level, a desired minimum level, an optional drop threshold, a sweet spot minimum level, a sweet spot target level, a sweet spot maximum level, an optional add threshold, a desired maximum level, an optional fast add threshold, an operating maximum level, and the non-ESS assets' operating maximum+ESS discharge limit level.

Referring to the X-axis (ESS SOC/SOE 302), above the operating maximum, the ESS may operate on a forced discharge and similarly, below operating minimum, the ESS may operate on a forced charge. Between the desired maximum and operating maximum levels, the ESS may discharge. Between operating minimum level and a desired maximum level, operation of the ESS may depend on the net load in relation to the non-ESS asset set points, as noted in the chart. If, for example, the ESS is charged between the sweet spot maximum level and the desired maximum level, and the non-ESS assets are able to manage load such that the non-ESS assets are operating at between a sweet spot minimum level and a sweet spot target level, the ESS may operate on a slow charge level (a charge power that is generally a fraction of the ESS charge power limit). However, if the ESS is charged between the sweet spot maximum level and the desired maximum level and the net load is operating between the non-ESS asset's sweet spot target level and the sweet spot maximum level, the ESS may operate on a slow discharge (a discharge power that is generally a fraction of the ESS discharge power limit). These two scenarios are merely exemplary and operation of the ESS asset based on the operation of the other multiple assets of the grid based on net load is shown in greater detail on the chart.

The chart shown in FIG. 3 assumes that the ESS has various SOC/SOE goals (which may be preprogrammed into and stored on the microgrid system controller 130, may be input to the system by a user in real time, or may be input to the system in other ways (e.g., based on one or more rules stored in the microgrid system controller 130). Another assumption of the chart 300 is that the non-ESS assets on the microgrid are targeted to be operated in their sweet spot range of operation. Additionally, for microgrids operating based on the chart 300, there are two possible scenarios: one is the case where there are assets available that are not currently running (they would be of lower priority than running assets, if that is the case), while the second is the case where all assets available are already running. If the treatment of ESS charge/discharge decision is different between the two cases, it is indicated in the chart, using a "/" between the two cases. For example, as seen from the chart between desired min and sweet spot min SOC/SOE levels, if the net load is between non-ESS assets' add threshold and desired max, decision is to (i) "idle" ESS (implying neither charge nor discharge), with the entire net load taken by non-ESS assets, if there are additional non-ESS assets available to bring into operation (this decision delays addition of assets, for economic dispatch, at slight expense of ESS charging needs) (ii) "slow charge" ESS (implying charge ESS at a fraction of its charge limit), with the resulting load taken by non-ESS assets, if there are no additional assets available (this decision takes care of ESS charging needs, and there are no expenses involved in starting new assets in this case).

Figure 4A:
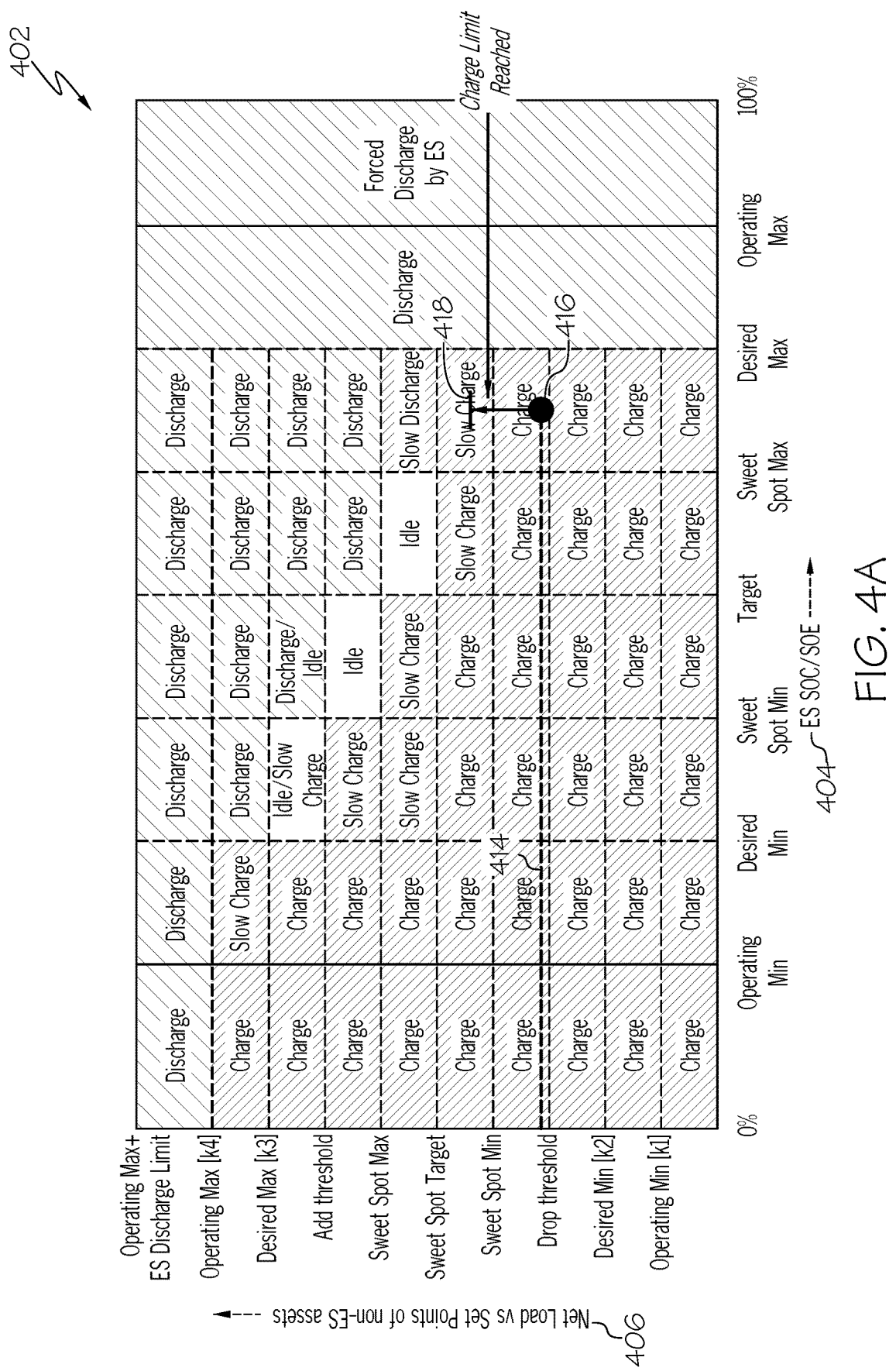
FIG. 4A is an operation chart for a microgrid operating a first energy storage system on the microgrid.
Figure 4B:
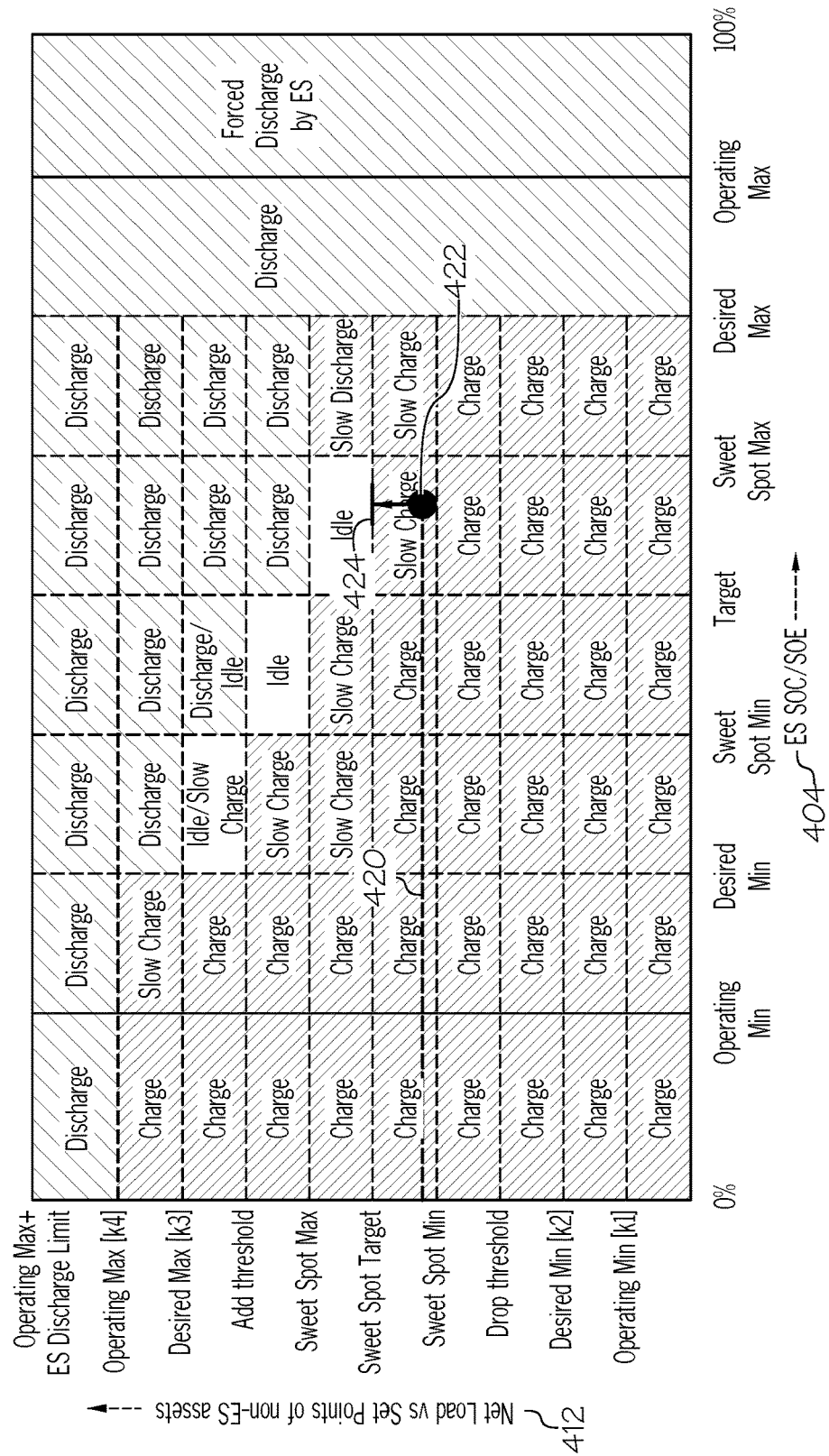
FIG. 4B is an operational chart for a microgrid operation a first and second energy storage system on the microgrid.

FIGS. 4A and 4B show a chart 402 and a chart 408 that respectively display some aspects of operation of a microgrid having two different ESS assets. More specifically, the chart 402 shows some characteristics of operation of the microgrid for a first asset and the chart 408 shows some characteristics of operation of the microgrid for a second asset. The hypothetical ESS assets represented by the chart 402 and the chart 408 have a different priority. Chart 402 represents an ESS asset having a higher priority than that represented by chart 408. Chart 402 shows a chart for a first ESS asset with an SOC/SOE 404 plotted against a net load on non-ESS assets of the microgrid (Net Load vs Set Points of non-ESS assets 406). Chart 408 shows a chart for a second ESS with an SOC/SOE 410 plotted against a net load on non-ESS assets of the microgrid (Net Load vs Set Points of non-ESS assets 412).

The setpoints of the ESSs described by charts 402 and 408 can be the same or different. That is the ESSs described by charts 402 and 408 can have the same or different operating minimum and maximum, desired minimum and maximum, sweet spot minimum and maximum, and target SOC and/or SOE. However, as mentioned, the ESSs may have different priority levels with respect to their charging and/or discharging on the electrical bus. Hence, a prioritization scheme for charging and/or discharging from the ESSs can be developed based on the different priorities. A scenario of ESS dispatch decisions is illustrated in charts 402 and 408. With respect to the scenario depicted in charts 402 and 408, the ESS described by chart 402 has a higher priority with respect to, at least, charging. Hence, the microgrid system controller 130 will cause the system to charge the ESS described by chart 402, at least partially, before it begins to charge the ESS described by chart 408.

As shown in FIG. 4A, an operational level 414 of the non-ESS assets is above a drop threshold (i.e., the minimum operational level at which the system can continue to operate current running multiple non-ESS assets on the grid before it must drop one or more of the assets based on too low a power level of the asset(s)) but below a sweet spot minimum level. Simultaneously, the first ESS asset is operating near its desired maximum SOC/SOE as shown at point 416. The microgrid may prioritize charging the first ESS asset until its SOC/SOE limit is reached. As the SOC/SOE of the first ESS asset continues to increase, and the load on the non-ESS assets increases based on the increased load of charging the ESS asset, the charging operation may change from a charging mode to a slow charging mode, ultimately stopping at point 418, because of charging limits. This sets net load on non-ESS assets corresponding to point 418, i.e. between sweet spot min and sweet spot target, and the first ESS asset is set for charging power, equaling the difference of power at 418 and power at 416.

Once the higher priority first ESS asset needs are taken into account, the microgrid 100 may subsequently commence considering the second ESS asset, which operational characteristics are shown in FIG. 4B. In the scenario considered, the second ESS asset is between the target and sweet spot max SOC/SOE (this is, of course, merely one example and many other scenarios are possible), and the new net load after considering first ESS asset charging is now between sweet spot min and sweet spot target, along the line 422. Based on the chart and scenario, the microgrid dispatch decision is to charge the second ESS asset till the net load on non-ESS assets is increased from point 420 till it reaches sweet spot target (point 424) assuming the ESS charging limit is higher than the difference between power at point 424 and power at point 420. The non-ESS assets may be dispatched at sweet spot target as shown at point 424. Other scenarios can easily be worked out based on the charts, and using charge/discharge limits for ESS assets. The scenarios can also be extended to three or more ESS assets, with different priorities.

In some scenarios, a prioritization between various ESSs on a microgrid may not be available, or priority may be the same. For example, for microgrids having very similar ESSs, with similar age, life, and chemical characteristics. Referring again to FIG. 3, the chart 300 can also be used to show a composite chart for a combined ESS asset having an ESS SOC/SOE 302 versus a net load on the non-ESS assets 304 for an exemplary microgrid. A combined ESS and associated chart with non-ESS asset may be necessary to operate the multiple ESSs on the microgrid if, for example, the priority is the same among multiple ESS assets, or no prioritization scheme for prioritizing between the various ESSs is available, required, or desired. In such a scenario, the combined ESS may be constructed that operates based on composite setpoints (using weighted averages) that are based on and take into account the setpoints of each of the various ESSs on the microgrid without a prioritization scheme between them. In embodiments having one or more ESSs with a prioritization scheme and multiple ESSs without a prioritization scheme, the microgrid controller system may follow the prioritization scheme with respect to the ESSs with a prioritization scheme, use combined ESS for the multiple ESSs without a prioritization scheme.

INDUSTRIAL APPLICABILITY

The disclosed aspects of the microgrid control mechanisms of the present disclosure may be used to operate a microgrid with one or more similarly prioritized ESS assets. In the context of a microgrid with multiple energy storage systems (ESSs), each possessing equivalent priority, the sophisticated microgrid control system can play a pivotal role in orchestrating efficient and reliable energy management. The control schema can employ one or more sophisticated control algorithm to amalgamate the capabilities and characteristics of the individual energy storage units into a unified entity, generally referred to herein as a composite ESS. By intelligently harmonizing the setpoints and operational characteristics of these diverse ESSs, the control system may optimize collective potential of the ESSs and optimize microgrid operation.

This composite ESS, with its consolidated setpoints and operating characteristics, serves as a versatile reservoir of power that can be harnessed to supply energy to the microgrid's loads. The control system can dynamically regulate the allocation of energy, ensuring a seamless balance between supply and demand while accounting for fluctuations in renewable energy sources and varying load requirements. By effectively leveraging the equivalent priority of the ESSs, the microgrid control system enhances grid resilience, minimizes energy wastage, and fosters a more sustainable and reliable energy distribution within the microgrid.

Figure 5:
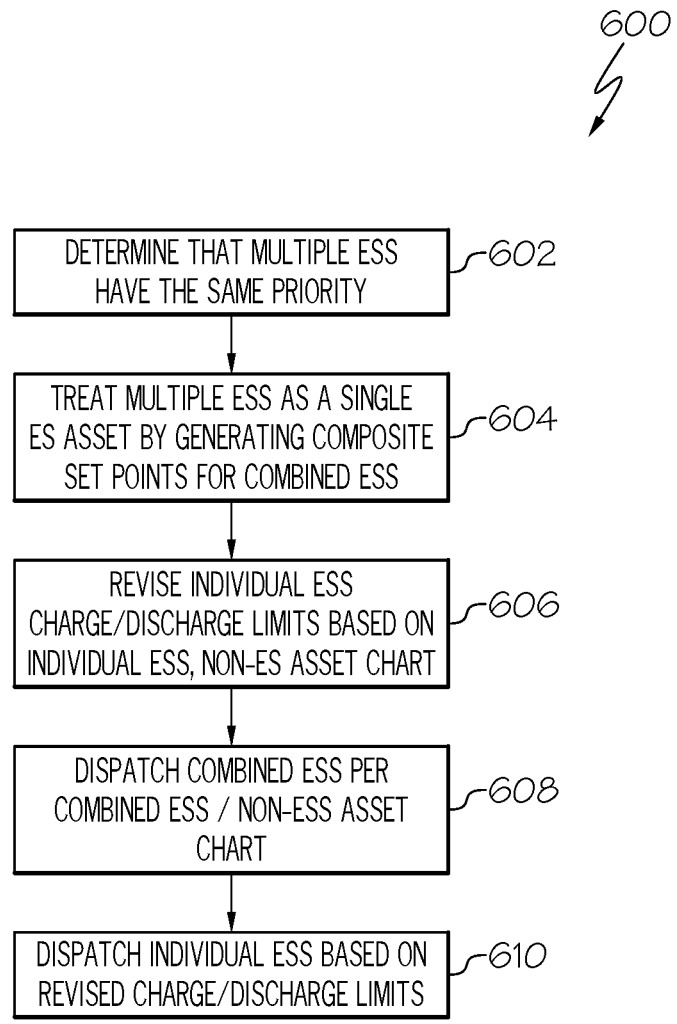
FIG. 5 is a method for operating a microgrid system with a composite energy storage system.

Referring to FIG. 5, a method of generating a combined ESS from multiple ESS assets with same priority is shown. It is to be understood that the individual steps of the method 600 are merely exemplary and implementations of the method 600 may include more or fewer steps to those shown in FIG. 5.

With reference to the microgrid 100 of FIG. 1 and the microgrid system controller 130 of FIG. 2, at step 602, it may be determined that an ESS group 110 on the electrical bus 102 has multiple ESS with the same priority. The multiple ESS can have various characteristics, set points, and other features (that is, the ESS group may be a varied ESS group). The determination may be made, for example, at the microgrid system controller 130 based on the priority inputs 208, 214. That is the priority inputs 208, 214 may be read by the microgrid system controller 130 as equivalent values. It may be determined, for example, that multiple ESS assets may be required to provide electrical power based on the loads 116 on the grid, but that there is no difference in priority between the various ESS assets available and necessary.

At step 604, the microgrid system controller 130 may treat the ESS group 110 as a single asset by generating composite set points for the combined ESS. The microgrid system controller 130 may use the weighting module 222, for example, to generate composite set points for the combined ESS based on the varied ESS group determined at step 602 as explained in greater detail herein.

At step 606, the microgrid system controller 130 may revise individual ESS charge and discharge limits based on the individual ESS, non-ESS asset chart(s). More specifically, the microgrid system controller 130 may the charge and discharge limits may be modified to set charge/discharge limits for individual ESS units to zero, under certain conditions, based on individual ESS charging chart, as explained in greater detail herein. The individual ESS charge and discharge limits may need to be revised because charging based on the composite set points alone could cause the individual set points to be exceeded. In some cases, the individual charge/discharge limits for one or more of the ESS in the group may be set to zero, for example, in order to avoid exceeding the individual charge/discharge limits for that particular ESS asset within the group.

At step 608, a combined ESS dispatch and non-ESS asset dispatch may be determined based on the levels shown in the combined ESS-non-ESS asset chart (e.g., as shown in FIG. 3). That is, the assets of the microgrid 100 may be dispatched accordingly (e.g., using the ESS power dispatch commands 230). Loading on the ESS may reduce the loading on the non-ESS assets. The levels may ensure that the load is shared proportionally between the ESS and non-ESS assets. This may help to balance the loads to be powered by both the non-ESS asset(s) and the ESS asset(s) and to meet the various set points of both.

At step 610, the individual ESS dispatch can be determined from the combined ESS dispatch, using weighting based on revised charge/discharge limits, as explained in greater detail herein. The individual ESS assets may be dispatched based on their individual charge/discharge limits such that no ESS asset exceeds its individual charge/discharge limit.

Figure 6:
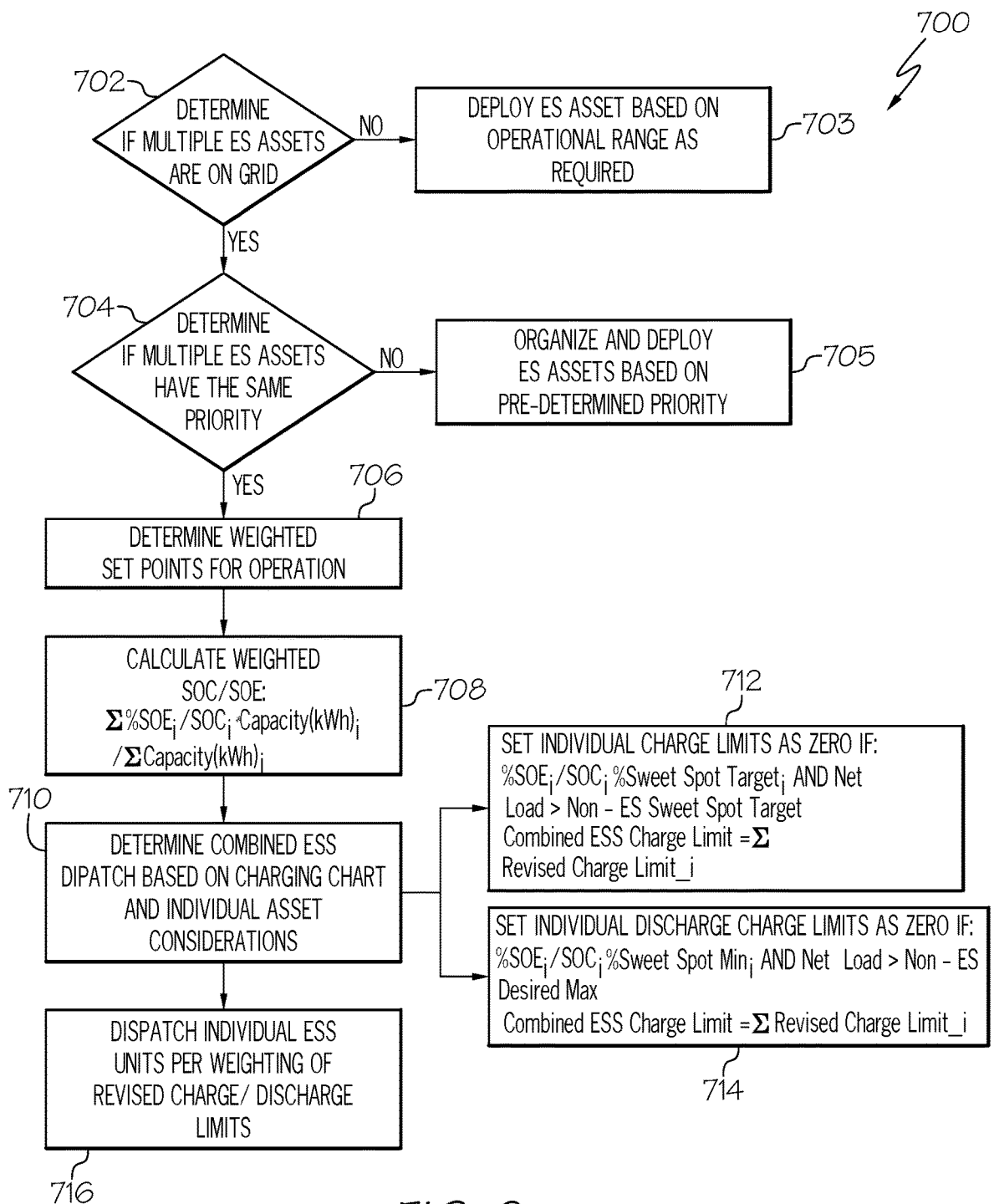
FIG. 6 is another method for operating a microgrid system with a composite energy storage system.

FIG. 6 shows a method 700 for generating composite ESS set points for a combined ESS for a group of two or more individual ESS assets without specific prioritization between the two or more individual ESS assets. The method 700 could be carried out, for example, using the microgrid 100 and the microgrid system controller 130 of FIGS. 1 and 2. One or more of the inputs 202 and the outputs 204 could be used to conduct the method 700, for example. Additionally, it is to be understood that the individual steps of the method 700 are merely exemplary and implementations of the method 700 may include more or fewer steps to those shown in FIG. 6.

At step 702, it may be determined if multiple energy storage (ES) assets are able to be electrically coupled to and/or able to supply electrical power to the microgrid system ("on the grid"). Step 702 can involve checking whether there are multiple ESS assets currently able to be connected to the grid using, for example, the status inputs 206, 212 to the microgrid system controller 130. The status inputs can provide, among other things, a SOC and SOE of the ESSs on the microgrid 100. Additionally, the status inputs 206, 212 can provide a charging/discharging status, a temperature, and other various characteristics of the ESS assets. If the SOC and the SOE are sufficient such that one or more connectable ESS are able to provide electrical power to the grid, the microgrid system controller 130 may continue.

If there are not multiple ESS assets on the microgrid, the microgrid system controller 130 may determine to energize one or more additional non-ESS assets (e.g., if there are no ESS assets available) charging based on a charging scheme such as that shown in the charging chart of FIG. 3. Alternatively, the microgrid system controller 130 may operate the single ESS asset on the grid to power electrical loads as necessary. Without multiple ESS assets on the grid, there are not multiple ESS assets to prioritize between and hence, no process of prioritization need be completed at step 703. However, if there are multiple ESS assets on the microgrid 100, the microgrid system controller 130 must follow and/or determine the priority of the ESS assets.

The priority among ESS units can be set a-priori, based on energy storage type and based on characteristics such as battery chemistry and other characteristics. In some cases, the microgrid controller may determine priority among multiple ESS units based on state of health to prioritize longer life ESS units for operation, for example. In some embodiments, all ESS units may have distinct priorities, all ESS units may have an equivalent priority, or some ESS units may have an equivalent priority, while other ESS units have distinct priorities. The ESS units may be organized based on a priority among the multiple ESS units as explained in greater detail herein.

At step 704, the microgrid system controller 130 may determine if multiple ESS assets have the same priority, or distinct priorities or mix of same and distinct priorities. For the multiple ESSs that do not have the same priority, the microgrid 100 may deploy the ESSs based on their predetermined priority at step 705. The microgrid system controller 130 may determine the priority of the multiple ESS assets based on priority inputs 208, 214, for example. If there are multiple ESS assets on the microgrid but none of the multiple ESS assets have the same priority, then the microgrid system controller 130 may deploy the ESS assets in the order of their priority. For example, higher priority assets may be placed on the microgrid before lower priority assets are placed on the microgrid. However, if there is one of more ESS groups, each with two or more ESS assets on the microgrid with the same priority in the group, then the microgrid system controller 130 may determine the dispatch for the combined ESS of such group, followed by distributed dispatch for individual ESS assets as explained in greater detail herein.

At step 706, the microgrid system controller 130 may determine weighted set points for operation of a combined ESS, for use for combined ESS dispatch according to the charging chart in FIG. 3. The weighting of set points is based on energy capacity of energy storage assets. For operating min/max, the combined ESS set points are given as below:

$$\frac{\sum \% \text{ Operating Min/Max Set Point}_i * \text{Capacity(kWh)}_i}{\sum \text{Capacity (kWh)}_i}$$

Similarly, for desired min and max, the combined ESS set points are given as below:

$$\frac{\sum \% \text{ Desired Min/Max Set Point}_i * \text{Capacity(kWh)}_i}{\sum \text{Capacity (kWh)}_i}$$

Similarly, for sweet spot min, max and target, the combined ESS set points are given as below:

$$\frac{\sum \% \text{ Sweet Spot Min/Max/Target Set Point}_i * \text{Capacity (kWh)}_i}{\sum \text{Capacity (kWh)}_i}$$

At step 708, the microgrid system controller 130 may calculate a weighted SOC/SOE. The weighted SOC/SOE can be calculated by summing together the product of a percent SOE and a capacity of an individual ESS asset for each asset in the group of assets and dividing by the sum by a summation of the capacities of each of the individual ESS assets. This is given in the formula below.

$$\frac{\sum \% \ SOE_i * \text{Capacity (kWh)}_i}{\sum \text{Capacity (kWh)}_i}$$

At step 710, the combined ESS dispatch and revised net load for non-ESS assets is determined. This dispatch includes consideration of individual ESS asset conditions. The individual asset considerations can include, for example, setting an individual charge limit to zero or setting individual discharge limits to zero based on various factors. For example, at step 712, individual charge limits may be placed at zero if a percentage of SOE for an asset is greater than the sweet spot target percentage, and the net load (i.e., a difference between demand and generation) is greater than the sweet spot target for the non-ESS assets on the microgrid as determined based on, for example, the non-ESS asset setpoints input 228, since under these conditions, there is no need to charge the specific individual ESS asset. Similarly, at step 714, individual discharge limits may be set at zero if a percentage of SOE for an asset is less than the sweet spot minimum percentage, and the net load is less than the non-ESS desired maximum, since there is no need to discharge the specific individual ESS asset. The charge/discharge limit for the combined ESS is sum of charge/discharge limits of individual ESS units, including considerations mentioned above. Now, the chart in FIG. 3 can be used to determine the combined ESS power dispatch, as well as the revised net load for the non-ESS assets. If there is no other lower priority ESS asset, the revised net load is same as the load on non-ESS assets, and it can be distributed among various running non-ESS assets, based on their priority, as well as decisions to add non-running assets, or to drop any running assets. However, if there is one or more ESS assets at a lower priority than the combined ESS group, then the net load is shifted to the corresponding charging chart, as explained in step 703, and via scenario in FIG. 4B.

Step 716 determines the individual ESS asset dispatch from the combined ESS asset dispatch in step 710, using the weighting of individual ESS asset charge/discharge limit, including revisions in steps 712 and 714, out of the combined ESS charge/discharge limit.

$$ES(Dis)\text{charge dispatch\_i} = \text{Combined } ES(Dis)\text{charge dispatch} * \frac{ES(Dis)\text{Charge Limit\_i}}{\text{Combined } ES(Dis)\text{charge Limit}}$$

The individual ESS asset dispatches may be made using, for example, the ESS power dispatch commands 230 from the microgrid system controller 130. The individual ESS asset dispatches may cause one or more ESS assets to provide electrical power to the microgrid or to cease providing electrical power to the microgrid based on the commands provide to the individual assets.

It should now be understood that optimized operation of a microgrid among multiple ESS assets with same priority can be achieved by employing weighted set points and weighted SOEs, while taking into consideration individual ESS asset conditions in setting their charge/discharge limits. As a result, the systems and methods described herein can facilitate efficient ESS operation, enhancing overall efficiency and performance.

By establishing priorities where appropriate, the most cost-effective and suitable ESS assets can be deployed for specific applications. Additionally, the provision of different set points based on the expected life of the storage system, as well as operating efficient points based on power and/or energy requirements is enabled. Furthermore, the method addresses potential imbalances within the same group of ESS assets, where different systems may have dissimilar SOC or SOE levels or dissimilar set points for operating, desired and sweet spot ranges. Such an approach to balanced and optimized operation can ensure that the individual characteristics of each ESS asset can be accounted for and optimized over time, promoting sustained uniform performance within a group over extended grid lifetimes.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. As used herein, the term "determine" can be used to refer to both retrieving or inputting a value and/or used to refer to calculating or deriving one or more values. It is intended that the specification and examples be considered as exemplary only, with a true scope of the disclosure being indicated by the following claims and their equivalents.

What is claimed is:

1. A microgrid system comprising:
   an electrical bus;
   at least one electrical load connected to the electrical bus;
   at least one non-energy storage system asset configured to supply electrical power to the electrical bus;
   an energy storage system group connected to the electrical bus, the energy storage system group including:
   two or more energy storage system assets configured to supply electrical power to the electrical bus; and
   a system controller operatively coupled to each of the assets connected to the electrical bus, wherein the system controller is configured to:
   determine that at least two of the energy storage system assets have a same priority for power distribution;
   determine characteristic power set points for the at least one non-energy storage system asset,
   generate a dispatch signal for the energy storage system assets having the same priority by treating a dispatch for the energy storage system assets having the same priority as a combined asset, wherein the system controller is configured to generate the dispatch signal by i) determining weighted set points for each of the energy storage system assets having the same priority, ii) modifying, based on the weighted set points, a charge/discharge limit corresponding to a state of charge or state of energy condition for each of the energy storage system assets having the same priority, and iii) computing the dispatch signal based on the modified charge/discharge limits, a load on the electrical bus, and the characteristic power set points for the at least one non-energy storage system asset, and
   dispatch, based on the generated dispatch signal, individual ones of the energy storage system assets having the same priority based on the modified charge/discharge limits.

2. The system of claim 1, wherein the two or more energy storage system assets comprise a first energy storage system asset and a second energy storage system asset, and wherein the priority of the first energy storage system asset and the second energy storage system asset correspond to a cost function associated with each of the first energy storage system asset and the second energy storage system asset.

3. The system of claim 2, wherein the power set point characteristics of the at least one non-energy storage asset comprise:
   an operating minimum corresponding to a state of charge or state of energy condition below which the at least one non-energy storage asset does not operate safely,
   an operating maximum above which the at least one non-energy storage asset does not operate safely, and
   a predetermined target state of charge or state of energy condition.

4. The system of claim 2, wherein the controller is configured to modify a charge limit of one of the energy storage system assets to be zero when the state of charge or state of energy condition of the energy storage system asset is above a predetermined threshold.

5. The system of claim 2, wherein the controller is configured to modify a discharge limit of one of the energy storage system assets to be zero when the state of charge or state of energy condition is below sweet spot minimum, and the load is at or below a predetermined threshold.

6. The system of claim 2, wherein the system controller is configured to operate one or more additional non-energy storage system assets when an existing reserve in running assets including energy storage system assets is less than a predetermined reserve.

7. The system of claim 2, wherein the system controller is configured to dispatch power among additional energy storage system assets ef having a different priority than the two or more energy storage systems having the same priority.

8. The system of claim 2, wherein the system controller is configured to at least one of reduce or eliminate dispatch to the non-energy storage system assets based on a level of reserve power.

9. The system of claim 2, wherein the at least one non-energy storage system asset is comprises at least one of a genset or a fuel cell.

10. The system of claim 2, wherein the system controller is configured to dispatch the non-energy storage system assets based on the charge/discharge limit of at least one of the energy storage system assets and reserve needs.

11. The system of claim 1, wherein the power set point characteristics of the at least one non-energy storage asset comprise:
an operating minimum corresponding to a state of charge or state of energy condition below which the at least one non-energy storage asset does not operate safely,
an operating maximum above which the at least one non-energy storage asset does not operate safely, and
a predetermined target state of charge or state of energy condition.

12. The system of claim 1, wherein the controller is configured to modify a charge limit of one of the energy storage system assets to be zero when the state of charge or state of energy condition of the energy storage system asset is above a predetermined threshold.

13. The system of claim 1, wherein the controller is configured to modify a discharge limit of one of the energy storage system assets to be zero if when the state of charge or state of energy condition is below sweet spot minimum, and the load is at or below a predetermined threshold.

14. The system of claim 1, wherein the system controller is configured to operate one or more additional non-energy storage system assets when an existing reserve in running assets including energy storage system assets is less than a predetermined reserve.

15. The system of claim 1, wherein the system controller is configured to dispatch power among additional energy storage system assets having a different priority than the two or more energy storage systems having the same priority.

16. The system of claim 1, wherein the system controller is configured to at least one of reduce or eliminate dispatch to the non-energy storage system assets based on a level of reserve power.

17. The system of claim 1, wherein the at least one non-energy storage system asset is comprises at least one of a genset or a fuel cell.

18. The system of claim 1, wherein the system controller is configured to dispatch the non-energy storage system assets based on the charge/discharge limit of at least one of the energy storage system assets and reserve needs.

* * * * *